2,841,845

PROCESS FOR PRODUCTION OF SHELL MOLDS

Julius M. Bleuenstein, Detroit, Mich., assignor to Ford Motor Company, Dearborn, Mich., a corporation of Delaware No Drawing. Application July 31, 1953
Serial No. 371,725

4 Claims. (Cl. 22—193)

The invention described in this specification is concerned with molding sands for reception of molten metals and the process by which such sands are produced. The so-called Croning or shell molding process has enjoyed an increasing popularity in recent years despite the expense incurred in the provision of the heat settable synthetic resins employed as a sand binder. In ordinary commercial use it has been found necessary to incorporate between 6 and 8 percent of phenol aldehyde resin in foundry sand to make shell molds having acceptable permeability and tensile strength. This significant amount of resin has added substantially to the cost of the process and has somewhat limited its utility. This invention has been conceived to lower the resin requirements and to produce a superior molding sand.

It has been found that certain substances if added to and mulled with hot sand will permit the use of a much smaller amount of resin with a sharp improvement in the physical properties. The most advantageous materials are those water insoluble substances based upon the stearyl radical, $C_{17}H_{36}$—C≡. This is intended to include stearyl alcohol as well as the water insoluble soaps based upon stearic acid. Stearyl alcohol, magnesium stearate, and zinc stearate have been found particularly valuable. Improvement in a lesser degree has been obtained with the addition of silicone oils and beeswax.

A typical mold sand mixture may be prepared as follows: 38$\frac{4}{10}$ pounds of Juniata sand exhibiting ASF number of 90 to 100 is first heated to a temperature above the boiling point of water and preferably in the range of 300 to 350° F. This hot sand is transferred quickly to a preheated muller and while the muller is in operation about 4 percent or 1$\frac{6}{10}$ pounds of a phenol aldehyde resin is added step wise. The phenol aldehyde resin may be added in the liquid form or its polymerization may have been carried to the stage where it is completely solid. It is important that, the resin be added gradually or step wise. During this addition of synthetic resin, it is preferred that no catalyst such as hexamethylenetetramine be present either in the sand or in the resin. The mixture of resin and hot sand is mulled for 6 to 10 minutes and then transferred to a cold muller. When sufficient cooling has occurred in the cold muller, a water suspension of hexamethylenetetramine is added and mulled into the sand. This hexamethylenetetramine is ordinarily employed in an amount equal to 10 to 14 percent by weight of the resin or in this case, about 0.16 pound. In this muller there is added 15 to 30 grams of magnesium or zinc stearate or stearyl alcohol or an equal amount of silicone oil or beeswax and the mulling continued for a period of 6 minutes more. This sand is now ready for the formation of shells.

The use of this type of sand resin mixture has resulted in an improvement in the case of stearyl alcohol and magnesium and zinc stearate of 50 percent in the tensile strength of the shell mold and has permitted a simultaneous reduction in resin content of the sand from 6 to 7 percent to 4 percent.

I claim as my invention:

1. In a process for the production of castings, the steps of heating molding sand substantially above the boiling point of water, mulling this hot sand and during the mulling operation adding to the hot sand a partially polymerized phenol-aldehyde resin free of all catalysts capable of effecting further consequential advancement of the resin at the temperature of the mulling operation, cooling the mulled mixture of sand and phenol-aldehyde resin, adding to the cooled mixture a polymerization catalyst, forming molds from the mulled mixture and pouring molten metal into the molds.

2. In a process for the production of castings, the steps of heating sand to a temperature of 300 to 350° F., mulling this hot sand and during the mulling operation adding to the hot sand a partially polymerized phenol-aldehyde resin free of all catalysts capable of effecting further consequential advancement of the resin at the temperature of the mulling operation, cooling the mulled mixture of sand and phenol-aldehyde resin, adding to the cooled mixture a polymerization catalyst, forming molds from the mulled mixture and pouring molten metal into the molds.

3. In a process for the production of castings, the steps of heating sand to a temperature of 300 to 350° F., mulling this hot sand and during the mulling operation adding to the hot sand a partially polymerized phenol-aldehyde resin free of all catalysts capable of effecting further consequential advancement of the resin at the temperature of the mulling operation, cooling the mulled mixture of sand and phenol-aldehyde resin, adding to the cooled mixture hexamethylenetetramine as a polymerization catalyst, forming molds from the mulled mixture and pouring molten metal into the molds.

4. A process for the production of a shell molding sand comprising heating molding sand substantially above the boiling point of water, mulling this hot sand, adding to the hot sand a partially polymerized phenol-aldehyde resin free of all catalysts capable of effecting further consequential advancement of the resin at the temperature of the mulling operation, cooling the mulled mixture of sand and phenol-aldehyde resin, adding to the cooled mixture a polymerization catalyst, and admixing the sand, resin and catalyst.

References Cited in the file of this patent

UNITED STATES PATENTS

| 2,148,642 | Ricard | Feb. 28, 1939 |
| 2,313,672 | Salzberg et al. | Mar. 9, 1943 |
| 2,488,332 | Roush | Nov. 15, 1949 |
| 2,662,067 | Less et al. | Dec. 8, 1953 |
| 2,706,188 | Fitko et al. | Apr. 12, 1955 |

FOREIGN PATENTS

| 1,005,710 | France | Jan. 2, 1952 |

OTHER REFERENCES

McCulloch P. B. Report 81,284, Apr. 8, 1948.